United States Patent [19]

Wu

[11] Patent Number: 5,790,879
[45] Date of Patent: *Aug. 4, 1998

[54] PIPELINED-SYSTOLIC SINGLE-INSTRUCTION STREAM MULTIPLE-DATA STREAM (SIMD) ARRAY PROCESSING WITH BROADCASTING CONTROL, AND METHOD OF OPERATING SAME

[76] Inventor: Chen-Mie Wu, 2F, No. 10, Lane 36, Sec. 3, Hsing Lung Rd., Taipei, Taiwan

[*] Notice: The term of this patent shall not extend beyond the expiration date of Pat. No. 5,659,780.

[21] Appl. No.: 544,449

[22] Filed: Nov. 17, 1995

Related U.S. Application Data

[63] Continuation-in-part of Ser. No. 260,393, Jun. 15, 1994, Pat. No. 5,659,780.

[51] Int. Cl.$^6$ .................................................. G06F 15/80
[52] U.S. Cl. ........................... 395/800.19; 395/800.11; 395/800.16; 395/800.22; 395/379; 711/109
[58] Field of Search .......................... 395/800, 800.1, 395/800.11, 800.14, 800.16, 800.19, 800.22, 377, 379; 711/109, 110, 149

[56] References Cited

U.S. PATENT DOCUMENTS

| | | | |
|---|---|---|---|
| 5,218,709 | 6/1993 | Fijany et al. | 395/800 |
| 5,361,367 | 11/1994 | Fijany et al. | 395/800 |
| 5,404,550 | 4/1995 | Horst | 395/800 |
| 5,581,773 | 12/1996 | Glover | 395/800 |
| 5,581,777 | 12/1996 | Kim et al. | 395/800 |

*Primary Examiner*—Meng-Ai T. An
*Attorney, Agent, or Firm*—Bacon & Thomas

[57] ABSTRACT

A pipelined-systolic SIMD array processing architecture includes an array of processing elements, registers-delays, and multiplexers. One or more of the registers-delays having one or more registers are added to the input and output ends of the processing elements for transferring data, with broadcasting and systolic methods being combined to transfer data into and out of the processing elements. By utilizing a single control unit, the functionalities of computation, shifting, transferring and accessing, achieving faster speed in data processing and accessing, and switching circuits may be added between the input/output ends of the processing elements and the registers-delay arrays, so as to transfer data even faster.

11 Claims, 7 Drawing Sheets

ONE OF EXAMPLES

DELAY CONTROL = 1
    REGISTERS-DELAY = ONE-REGISTER DELAY

DELAY CONTROL = 2
    REGISTERS-DELAY = TWO-REGISTER DELAY

DELAY CONTROL = 3
    REGISTERS-DELAY = THREE-REGISTER DELAY DELAY CONTROL = 4
    REGISTERS-DELAY = FOUR-REGISTER DELAY

*FIG. 9*

PIPELINED-SYSTOLIC SINGLE-INSTRUCTION STREAM MULTIPLE-DATA STREAM (SIMD) ARRAY PROCESSING WITH BROADCASTING CONTROL, AND METHOD OF OPERATING SAME

The present invention is a continuation-in-part of the U.S. patent application Ser. No. 08/260,393, filed on Jun. 15, 1994, Pat. No. 5,659,780.

BACKGROUND OF THE INVENTION

1. Field of the Invention

The present invention relates in general to an architectural design which can be applied to a parallel processor, image processor, digital signal processor, etc., capable of processing with improved efficiency in the transmission and transfer of data, and can be implemented on a single VLSI chip for improved utility.

2. Technical Background

The principal object of the pipelined-systolic SIMD array processing architecture and its method of operation of the present invention is to provide a method for the transfer, shift, and access of data, achieving faster speed and higher efficiency in data processing and accessing thereof.

A secondary object of the pipelined-systolic SIMD array processing architecture and its method of operation of the present invention is to reduce the number of data lines and IC pins, to prevent the complexity caused by excessive control lines, to improve the utilization efficiency of the memory, and to be able to be implemented in a VLSI chip.

Another object of the pipelined-systolic SIMD array processing architecture and its method of operation of the present invention is to allow its VLSI chip to be added directly into a computer or a television set, so as to increase the effectiveness of a various image processing functions, improve usefulness and convenience, conserving required space.

Yet another object of the pipelined-systolic SIMD array processing architecture and its method of operation of the present invention is to allow data in the output registers-delay array to be provided as the input of the main architecture of the processing elements, so that data transfer and computation may be faster.

Still another object of the pipelined-systolic SIMD array processing architecture and its method of operation of a present invention is to allow data access elements to be utilized as the processing elements in the entire array thereof, so as to fulfill the requirement of achieving high speed operation utilizing low speed elements, without difficulty.

Still another object of the pipelined-systolic SIMD array processing architecture and its method of operation of the present invention is to allow for the simultaneous and parallel utilization of the multiple registers-delay arrays, as well as the use of broadcasting data lines, so as to achieve improved performance.

Still another object of the pipelined-systolic SIMD array processing architecture and its method of operation of the present invention is to allow the use of a broadcasting control method in the control unit thereof, and achieving the functionality of data processing by incorporation with systolic controlling method.

Still another object of the pipelined-systolic SIMD array processing architecture and its method of operation of the present invention is to allow for the connection of switching circuits between the input and output ends of the main array of processing elements and the multiple registers-delay arrays, so as to diversify and accelerate the transfer of data.

To achieve the above-described objects, the present invention has a main architecture of an array type that comprises a plurality of processing elements, with single or multiple registers-delay arrays individually provided at the input and output ends of the main architecture of the processing elements, and with a set of broadcasting data transfer lines connected to the input ends of the main architecture, so as to receive both the feedback output of the main architecture itself and the external input data, while the input ends of the processing elements of the main architecture are connected to the input shift registers-delay arrays and the output ends of the main architecture are connected to the output shift registers-delay arrays, with the registers-delays and multiplexers in each of the registers-delay arrays, and the processing elements, all controlled by the control unit.

The detailed configuration, principle of application, effect and functionality of the present invention may be fully comprehended by referring to the following description based on the accompanied drawings:

DETAILED DESCRIPTION OF THE PREFERRED EMBODIMENT

Figure 1:
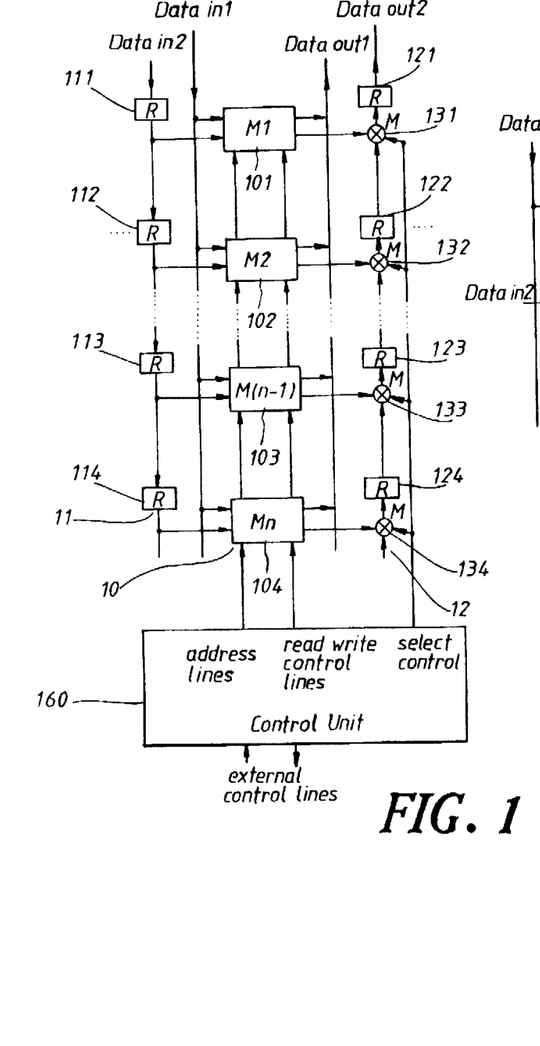
FIG. 1 is a structural schematic diagram of the present invention in which the pipelined data access elements are utilized as the processing elements.

As illustrated in FIG. 1, a number of registers R 111–114 are provided at the input ends of the pipelined data access elements M1–Mn 101–104, while a number of registers R 121–124 and multiplexers M 131–134 are provided at the output ends thereof, with the registers R 121–124 and multiplexers M 131–134 systolically connected into a register array 12 and provided at the output ends of the main architecture 10 of the processing elements. Registers R 111–114 are likewise connected in a register array 11 and provided at the input ends of the main architecture 10 of the processing elements, and the pipelined data access elements M1–Mn 101–104 are arranged into the main architecture 10, with the registers R 121–124, multiplexers M 131–134 and pipelined data access elements M1–Mn 101–104 all controlled by the control unit 160.

Figure 2:
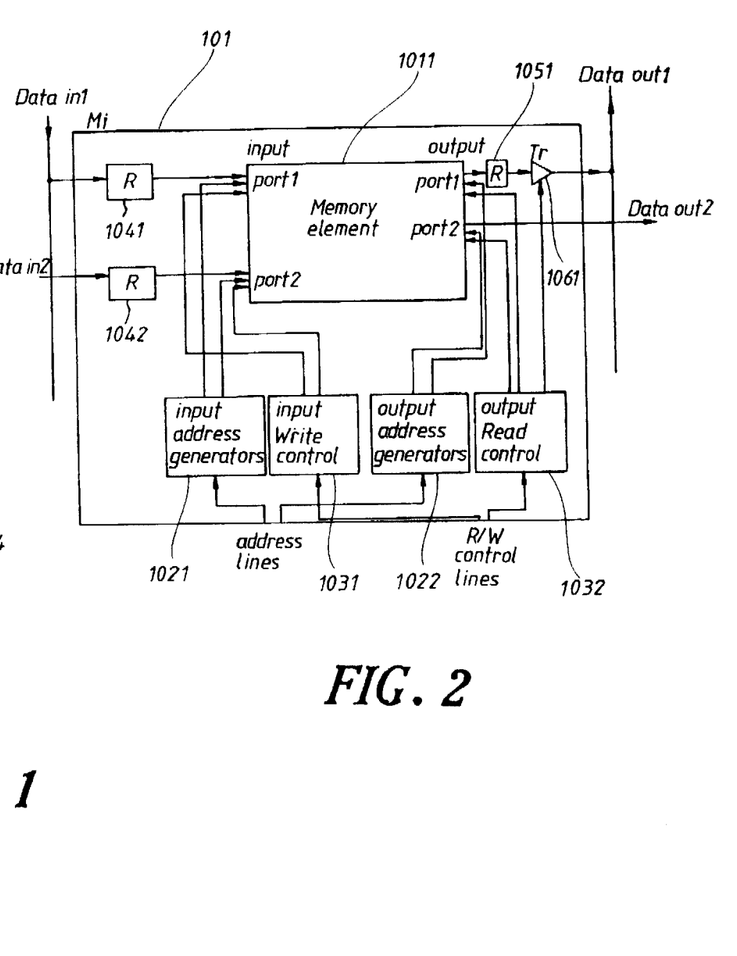
FIG. 2 is a structural schematic diagram of the data access element of the present invention in which the pipelined data access elements are utilized as the processing elements.

FIG. 2 shows in detail one of the pipelined data access elements M1 101, including a memory element 1011, an input address generator 1021, an output address generator 1022, an input write control 1031, an output read control 1032, registers 1041, 1042 and 1051 and a three-state buffer 1061, wherein, the source end of the input address generator 1021 is connected to the control unit 160, the output end thereof is connected to the input port of the memory element 1011; and the source end of the input write control 1031 is connected to the control unit 160. The output end thereof is connected to the input port of the memory element 1011, the source end of the output address generator 1022 is connected to the control unit 160, the output end thereof is connected to the output port of the memory element 1011; the source end of the output read control 1032 is connected to the control unit 160, the output thereof is connected to the output port of the memory element 1011, registers 1041 and 1042 are provided between the connection of the memory element 1011 and the external data lines, and the three-state buffer 1061 is located in the connection path between the register 1051 connected to the output port of the memory element 1011 and the external data lines, buffer 1061 being controlled by the output read control 1032.

Figure 3:
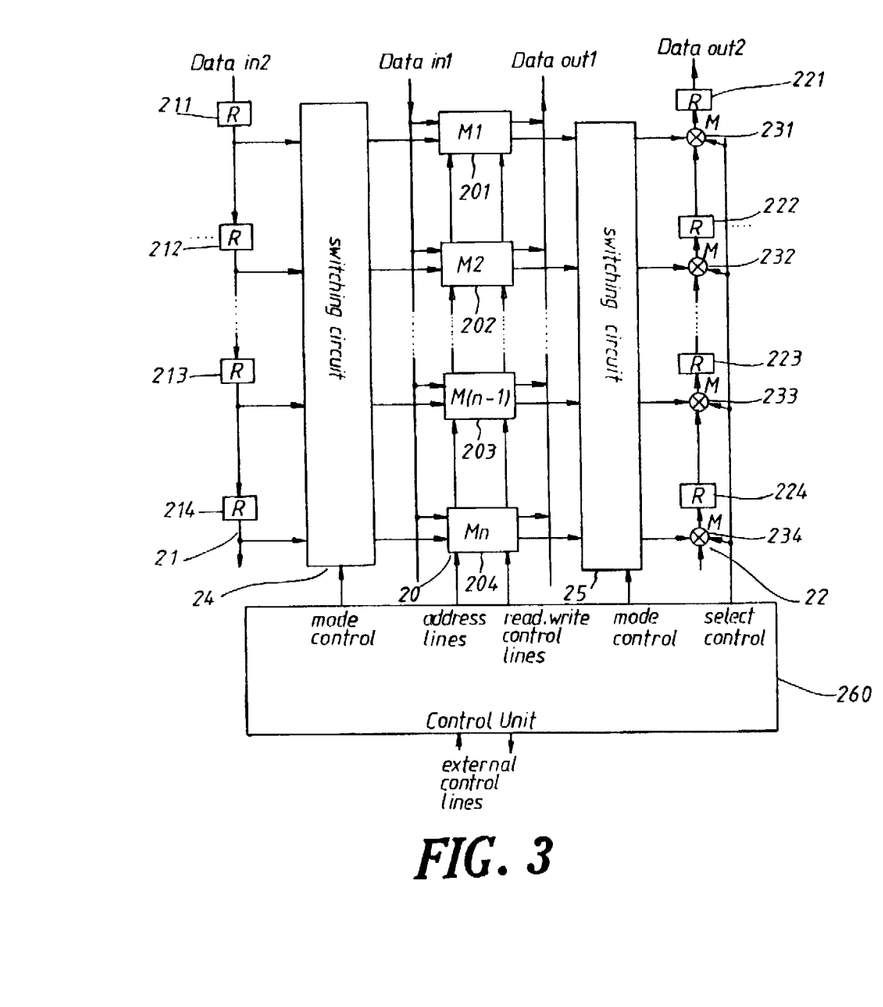
FIG. 3 is a structural schematic diagram of the present invention in which the pipelined data access elements are utilized as the processing elements and further incorporated with the switching circuits.

FIG. 3 shows the connection of the switching circuits 24 and 25 among both the input and output ends of the pipelined data access elements M1–Mn 201–204 and the multiple register arrays 21 and 22 that comprise registers 211–214, and registers 221–224 and multiplexers M 231–234, respectively. As illustrated switching circuits 24 and 25 are connected to and controlled by the control unit 260, so that data transfer may be implemented in one of the multiple modes (as is seen in FIG. 4), thereby diversifying the variety of data transmission and transfer.

Figure 4:
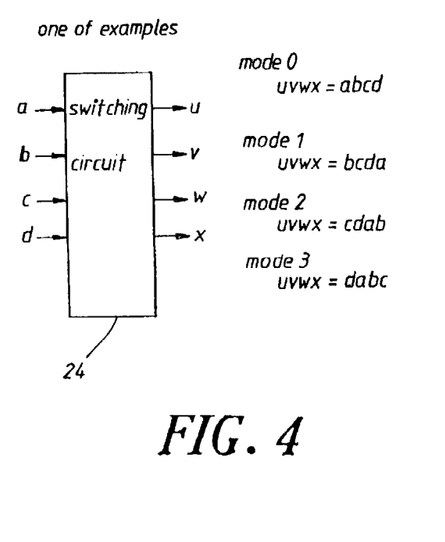
FIG. 4 schematically shows the data transfer modes of the switching circuit of the present invention.

As is seen in FIG. 4, which provides an example of a main array architecture comprising four pipelined data access elements, the multiple operating modes of the switching circuits may be:

| mode 0 | u v w x = a b c d |
| mode 1 | u v w x = b c d a |
| mode 2 | u v w x = c d a b |
| mode 3 | u v w x = d a b c |

Figure 5:
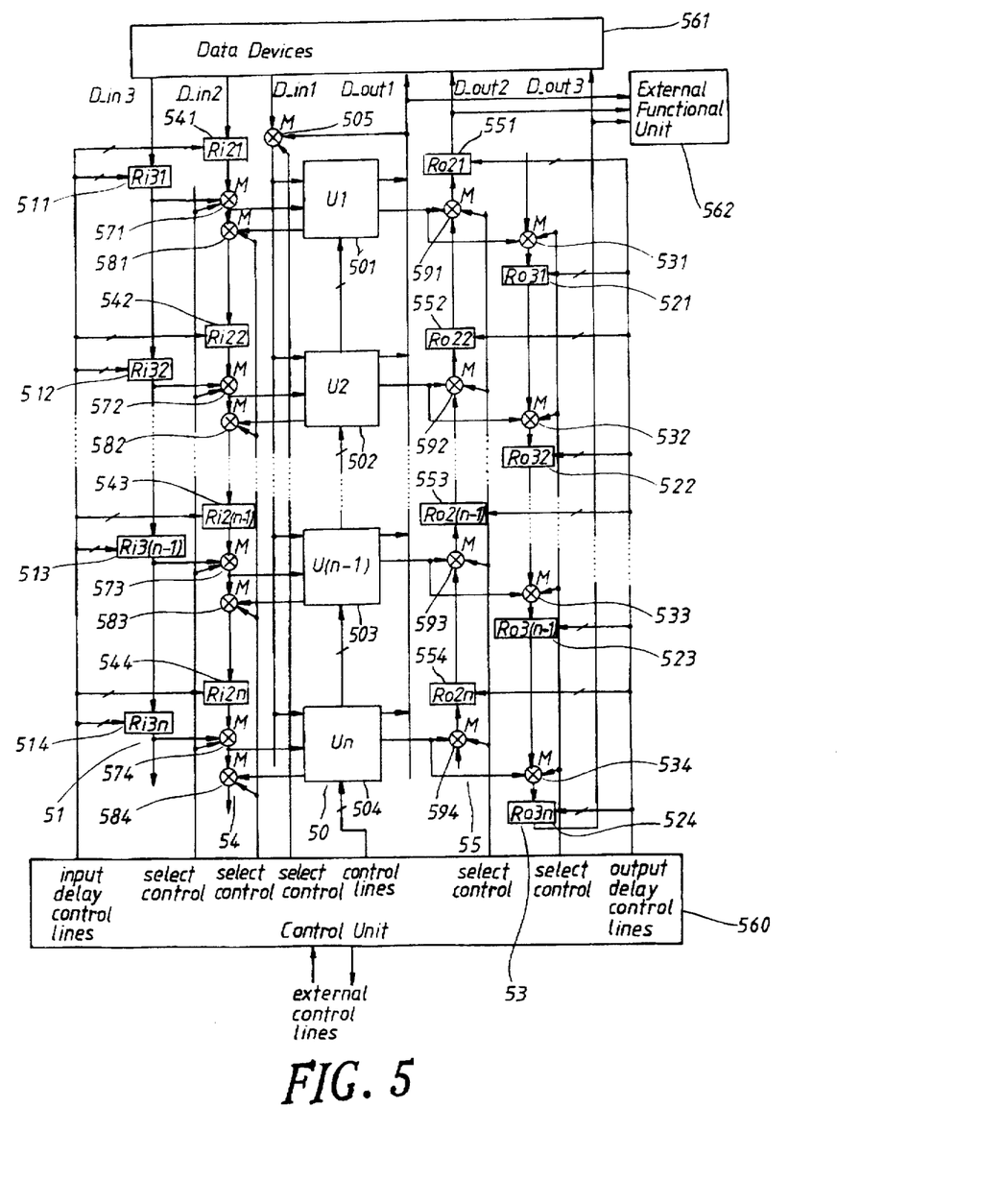
FIG. 5 is a structural schematic diagram of an embodiment of the present invention in which the pipelined processing elements are utilized as the processing elements and the output shift registers-delay arrays featuring bidirectional functionality.
Figure 9:
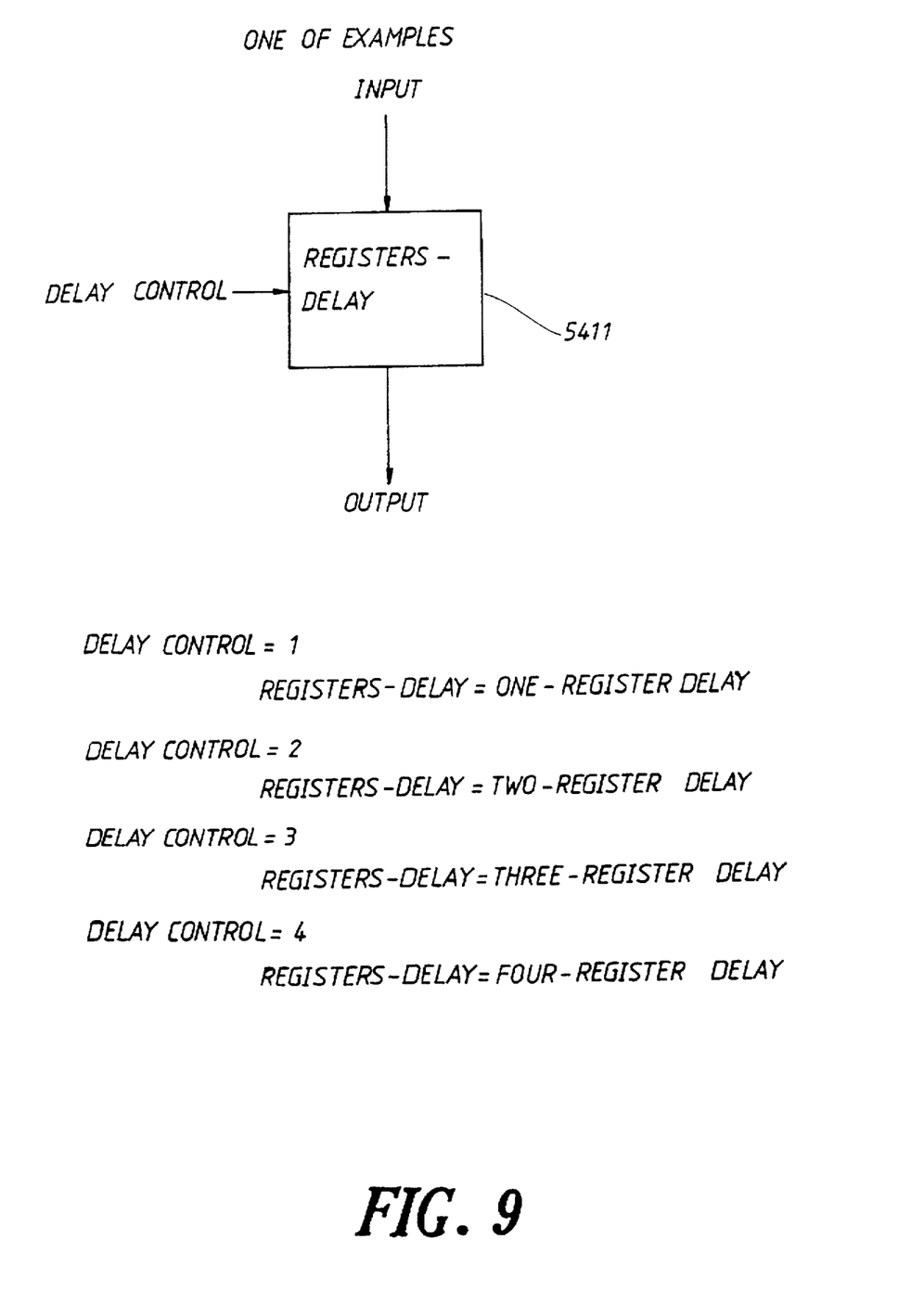
FIG. 9 schematically shows the data transfer modes of the registers-delay of the present invention.

Alternatively, as shown registers-delays 511–514, 521–524, 541–544 and 551–554 and multiplexers M 531–534, 571–574, 581–584 and 591–594 are provided at both the input and output ends of the processing elements U1–Un 501–504, the registers-delay being made up of one or more delay registers (as is seen in FIG. 9), while the number of delay registers used may be determined based on the period being delayed, and is controlled by the control unit 560, and the registers-delays and the multiplexers M are systolically connected into the registers-delay array and provided to both the input and output ends of the main architecture 50 of the processing elements. The processing elements U1–Un 501–504 are arranged into the main architecture 50, with a set of broadcasting transmission lines connected to the input end of the main architecture 50 of the processing elements U1–Un 501–504, so as to receive the feedback output of the main architecture 50 of the processing elements via the feedback multiplexer 505 and the external input data transmitted from the data devices 561, while the input end of the main architecture 50 of the processing elements U1–Un 501–504 is connected to the registers-delay arrays 51 and 54, and the output end of the main architecture 50 of the processing elements U1–Un 501–504 is also connected to registers-delay arrays 53 and 55, and the registers-delay arrays have the functionality of bidirectional transmission, and an optional external functional unit 562 receives data from the main architecture 50 and the registers-delay arrays 53 and 55 for processing, while the registers-delays and multiplexers M in the above-described registers-delay arrays and the processing elements U1–Un 501–504 are all connected to and controlled by the control unit 560.

Figure 6:
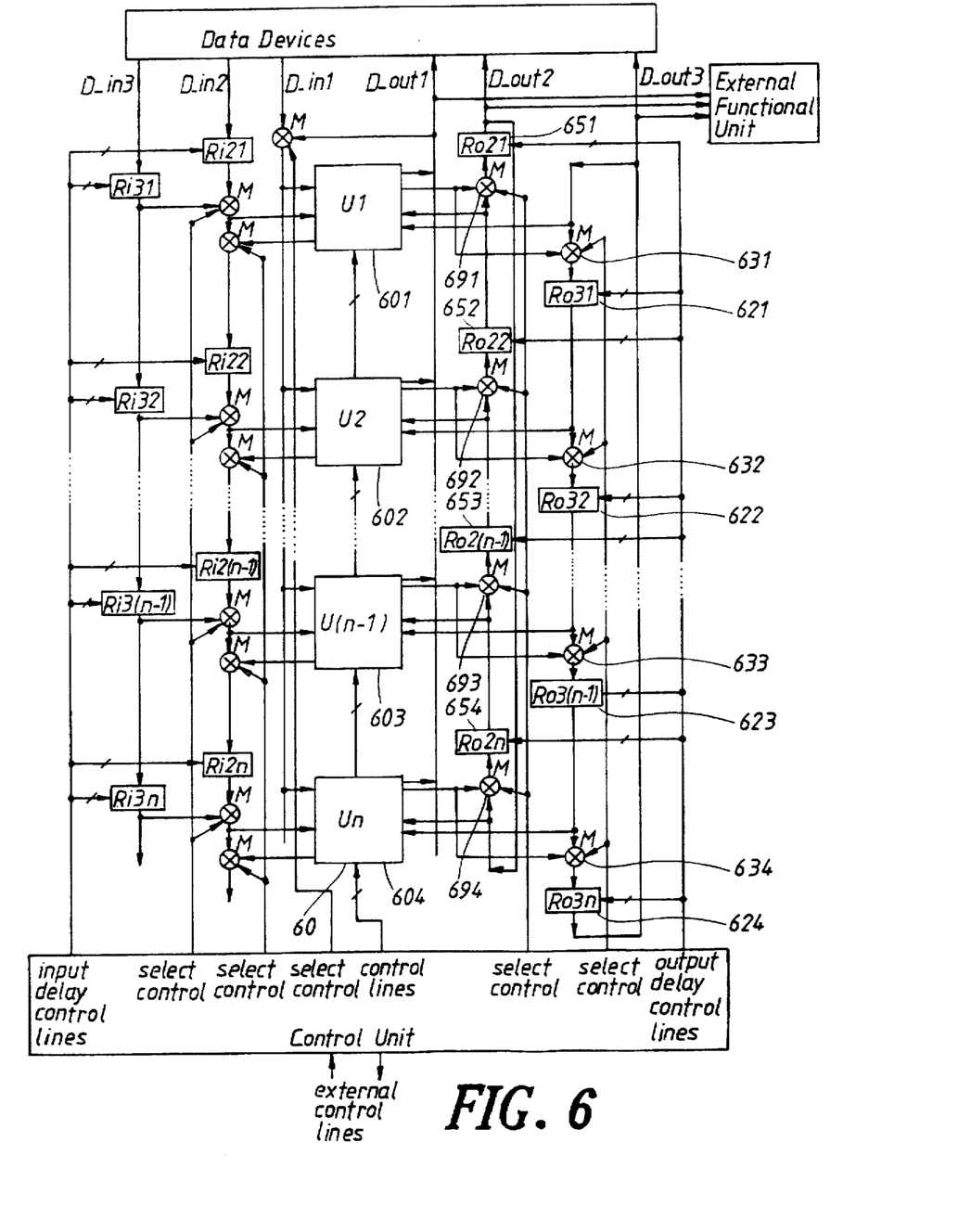
FIG. 6 is a structural schematic diagram of an embodiment of the present invention in which the pipelined processing elements are utilized as the processing elements and featuring feedback means and with cyclic output shift registers-delay array.

FIG. 6 shows that the registers-delay arrays at the output end of the array 60 of the processing elements U1–Un 601–604, may also transfer data to the array 60 of the processing elements U1–Un 601–604 via controlling multiplexers 631–634 and 691–694 and registers-delays 621–624 and 651–654, so as to achieve the effectiveness of input in the reverse direction, while the registers-delay array further features the functionality of cyclic shifting, so that the data transmission and transfer may be done even faster.

Figure 7:
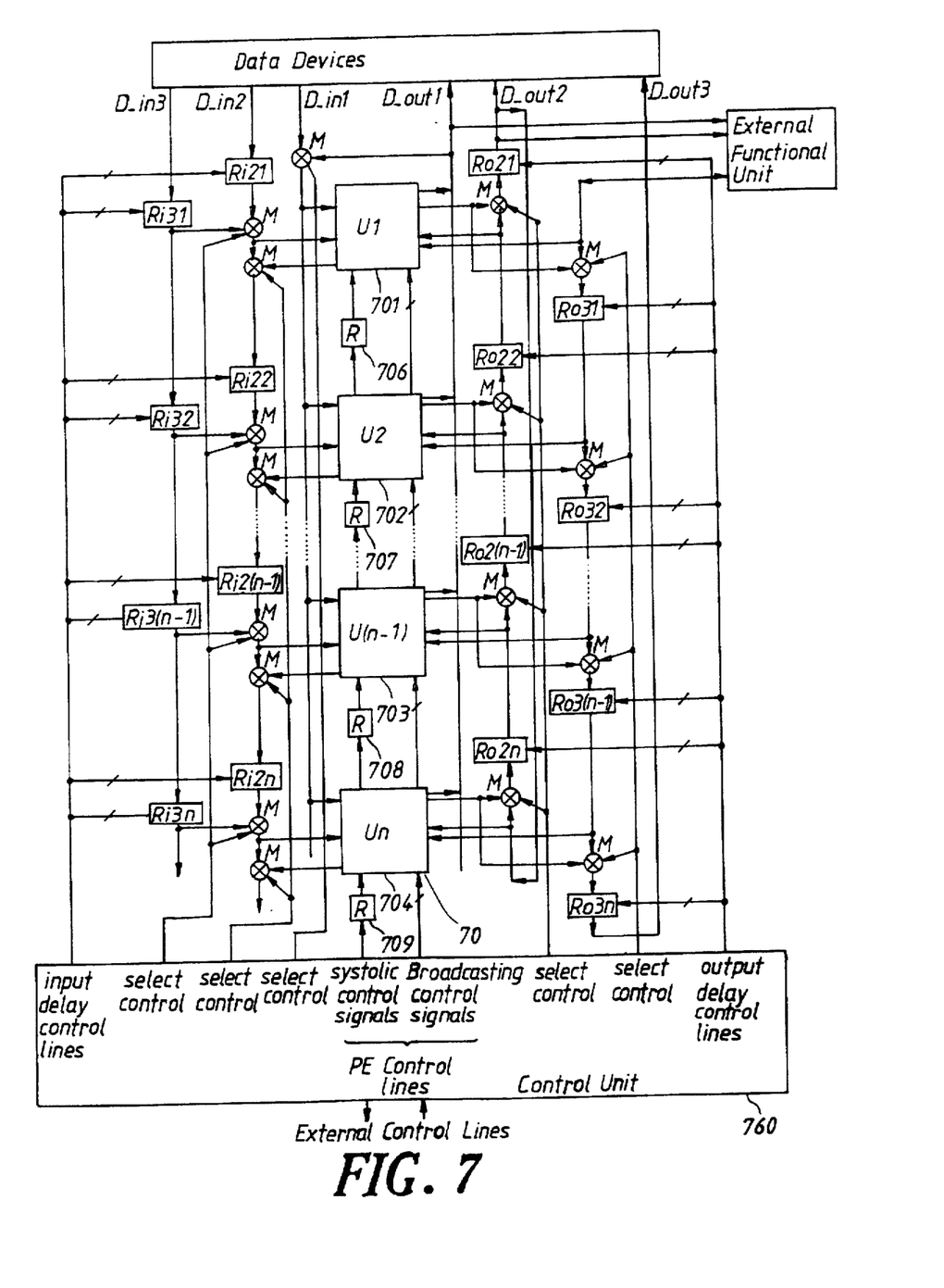
FIG. 7 is a structural schematic diagram of another embodiment of the present invention in which the pipelined processing elements are utilized as the processing elements.

FIG. 7 shows that registers 706–709 may be added among the processing elements U1–Un 701–704 of the main architecture 70, with processing elements U1–Un receiving control signals from the control unit 760 systolically, so as to achieve the effectiveness of both broadcasting control and systolic control.

Figure 8:
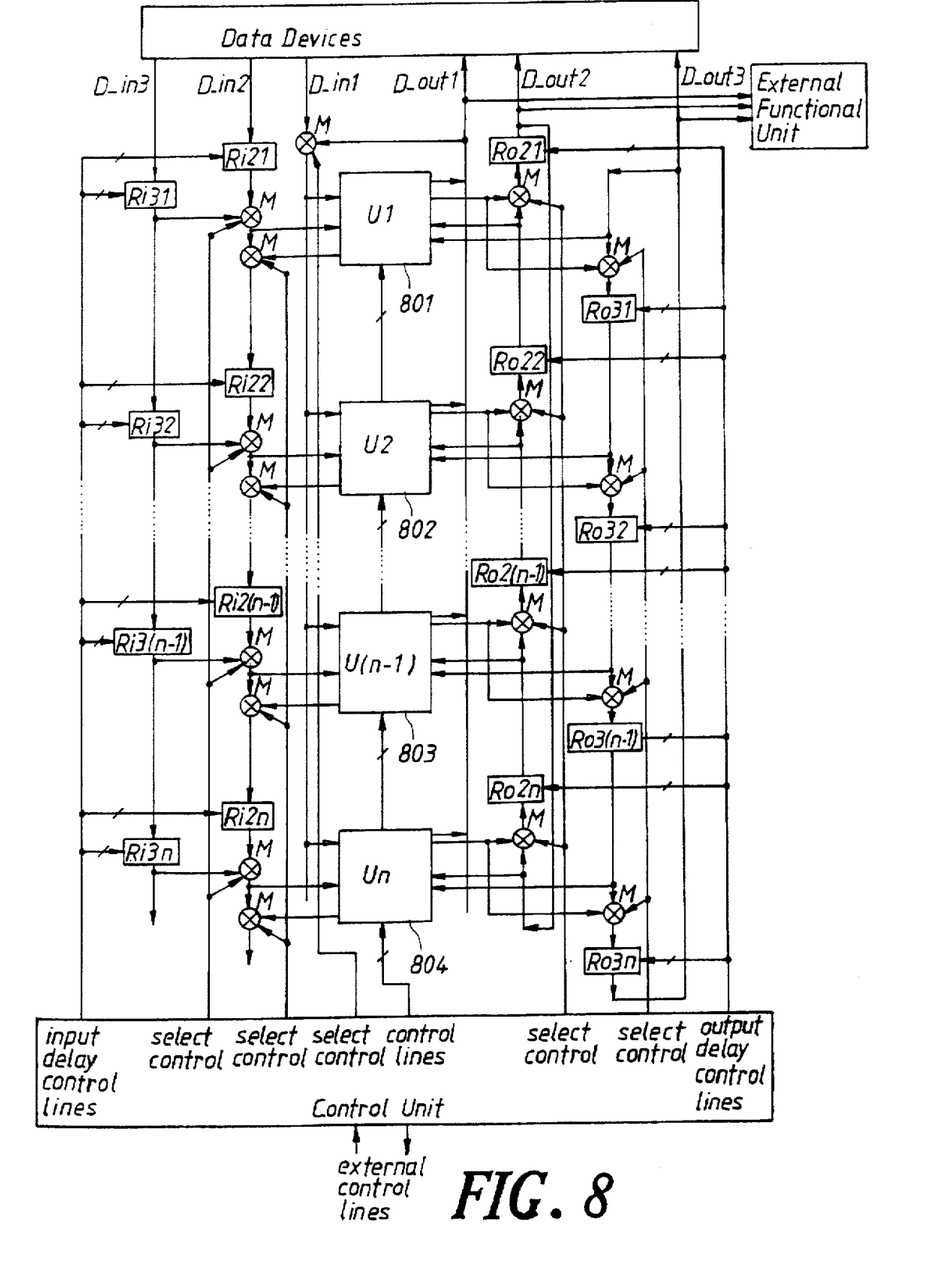
FIG. 8 is a structural schematic diagram of an embodiment of the present invention in which the pipelined processors are utilized as the processing elements.

In FIG. 8, the pipelined processors 801–804 are utilized as the processing elements. Each a central processing unit, memory, I/O data queues and bus controller, and may implement high speed data computation, access, transfer, and input/output, and is applicable to various fields such as image processing, digital signal processing, and computer parallel processing.

FIG. 9 takes an example of the registers-delay 5411 having four registers. The various operational modes of the registers-delay may be seen from the drawing to be:

```
DELAY CONTROL = 1;
    REGISTERS-DELAY = ONE-REGISTER DELAY
DELAY CONTROL = 2;
    REGISTERS-DELAY = TWO-REGISTER DELAY
DELAY CONTROL = 3;
    REGISTERS-DELAY = THREE-REGISTER DELAY
DELAY CONTROL = 4;
    REGISTERS-DELAY = FOUR-REGISTER DELAY.
```

In summary, the pipelined-systolic SIMD array processing architecture of the present invention executes data computation, access, transfer and input/output in parallel based on the control of each respective control signals, so that the computation time is conserved, while massive time periods and connection wires required for the loading of data are also conserved, which features industrial usefulness to comply with the requirements for the issue of a patent.

I claim:

1. A pipelined-systolic single-instruction stream multiple-data steam (SIMD) array processing architecture, comprising:

a control unit;

a main architecture of an array type comprising a plurality of pipelined data access elements;

an input register array, comprising a plurality of shift registers connected in series and controlled synchronously, the series connection and synchronous control being hereinafter referred to as a systolic connection, and located at an input end of the main architecture of the pipelined data access elements;

an output register array, comprising a plurality of said systolically connected shift registers, wherein multiplexers are provided at a transfer end of each of the shift registers, and the output register array is provided at an output end of the main architecture of the pipelined data access elements; and a main array of pipelined data access elements, wherein input ends of the main array are connected with the input register array, output ends of said main array of pipelined data access elements are connected to the output register array, and the registers and multiplexers of each of said register arrays and pipelined data access elements are controlled by the control unit.

2. A pipelined-systolic single-instruction stream multiple-data steam (SIMD) array processing architecture, comprising:

a control unit;

a main architecture of an array type comprising a plurality of processing elements;

a plurality of registers-delay arrays, said registers-delay arrays comprising at least one shift register, wherein each of the registers-delay arrays are connected in series and controlled synchronously, the series connection and synchronous control being hereinafter referred to as a systolic connection, multiplexers are provided at the transmission ends of each of the registers-delay arrays, and one or more registers-delay arrays are provided at input and output ends of the main architecture of the pipelined elements;

a set of broadcasting transmission lines connected to the input ends of the main architecture of the processing elements for receiving a feedback output of the main architecture of the processing elements and external input data;

wherein the inputs ends of the main architecture are connected to at least one of said registers-delay arrays, the input ends of said main architecture are connected to the set of broadcasting transmission lines, the output ends of said main architecture are further connected to at least one of said registers delay arrays, and the registers-delays and multiplexers of each of said registers-delay arrays and processing elements are controlled by the control unit.

3. The pipelined-systolic single-instruction stream multiple-data stream (SIMD) array processing architecture of claim 1, wherein said pipelined data access elements comprise:

a memory element having input ports connected with a register, an input address generator, and an input write control, and output ports connected with an output address generator and an output read control, and said output ports being further connected to external transmission lines via a second register and a three-state buffer;

input/output address generators having input ends controlled by the control unit, and output ends connected to the input/output ports of said memory element;

an input write and output read control having input ends controlled by the control unit, and output ends connected to the input and output ports of said memory element;

a plurality of registers, each provided between the memory element and one of the external data lines; and a three-state buffer, located between the output port of the memory element and the register connected thereto, and controlled by the output read control.

4. The pipelined-systolic single-instruction stream multiple-data stream (SIMD) array processing architecture of claim 1, wherein switching circuits are connected between the input ends and the output ends of the main architecture and the input and output registers-delay arrays, and said switching circuits are controlled by the control unit.

5. The pipelined-systolic single-instruction stream multiple-data stream (SIMD) array processing architecture of claim 2, wherein said main architecture consisting of said plurality of processing elements is an array constructed by pipelined processing elements.

6. The pipelined-systolic single-instruction stream multiple-data stream (SIMD) array processing architecture of claim 2, further comprising at least one registers-delay arrays connected to the output ends of the main architecture for providing bidirectional and cyclic shifting of data input to the processing elements.

7. The pipelined-systolic single-instruction stream multiple-data stream (SIMD) array processing architecture of claim 2, further comprising at least one registers-delay array connected to the output ends of the main architecture of the processing elements to provide input data to the processing elements via the feedback circuit.

8. A pipelined-systolic single-instruction stream multiple-data stream (SIMD) array processing method, comprising the steps of:

controlling multiplexers to systolically transfer data from a data device to a first input shift registers-delay array, said first input shift registers-delay array including at least one first shift register;

systolically transferring data from the data device to a second input shift registers-delay array, said second input shift registers-delay array including at least one second shift register;

controlling the multiplexers to transfer data from said second input shift registers-delay array to said first input shift registers-delay array and to the set of processing elements;

transferring data from said data device to said processing elements utilizing an input broadcasting circuitry;

controlling the multiplexers and transferring data from wired-OR output ends of the processing elements to input ends of the processing elements via said input broadcasting circuit;

transferring data from said first input shift registers-delay array to a second input port of said processing elements in parallel;

transferring data from said input broadcasting circuit to a first input port of said processing elements;

said processing element performing computational functions under programmable operating modes;

transferring the results of computations from the output port of said processing elements to an output shift registers-delay array in parallel by properly controlling the multiplexers, said output shift registers-delay array including at least one output shift register;

systolically transferring the results of computations from said output shift registers-delay array to the processing elements, data devices or external multi-functional units;

transferring the results of computations from wired-OR output ends to said data devices or external multi-functional units; wherein said input shift registers-delay array, input broadcasting circuit, processing elements, output shift registers-delay array, wired-OR output circuit and data devices operate in parallel under the control of the control unit to transfer and process data.

9. The pipelined-systolic single-instruction stream multiple-data stream (SIMD) array processing architecture of claim 1, wherein the array processing architecture is a multidimensional architecture.

10. The pipelined-systolic single-instruction stream multiple-data stream (SIMD) array processing architecture of claim 2, wherein the array processing architecture is a multidimensional architecture.

11. The pipelined-systolic single-instruction stream multiple-data stream (SIMD) array processing architecture of claim 2, wherein the control signals generated by the control unit are sent to processing elements in a way which combines both broadcasting and systolic methods.

* * * * *